(12) United States Patent
Hayashi et al.

(10) Patent No.: US 7,508,199 B2
(45) Date of Patent: Mar. 24, 2009

(54) ABSOLUTE ENCODER

(75) Inventors: Yasukazu Hayashi, Aichi (JP);
Noriyuki Fukui, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 12/047,861

(22) Filed: Mar. 13, 2008

(65) Prior Publication Data

US 2008/0231266 A1    Sep. 25, 2008

(30) Foreign Application Priority Data

Mar. 20, 2007   (JP)   ............................. 2007-073247

(51) Int. Cl.
*G01B 7/30* (2006.01)
(52) U.S. Cl. .................. 324/207.25; 324/174
(58) Field of Classification Search ......... 324/173–174, 324/207.25, 242–243; 73/514.31, 514.39
See application file for complete search history.

(56) References Cited

U.S. PATENT DOCUMENTS 3,366,874 A * 1/1968 Kuhne .................. 324/207.17
4,951,048 A * 8/1990 Ichikawa et al. .............. 341/15

FOREIGN PATENT DOCUMENTS

JP         5-118874         5/1993

OTHER PUBLICATIONS esp@cenet patent abstract for Japanese Publication No. 5118874, Publication date May 14, 1993 (1 page).

* cited by examiner

*Primary Examiner*—Bot LeDynh
(74) *Attorney, Agent, or Firm*—Osha • Liang LLP (57) ABSTRACT

A printed circuit board on which are laid out detection windings and an excitation magnetic flux detection winding formed of conductor patterns is disposed so as to be spaced a predetermined gap quantity from a binary cyclic random number sequence code plate which is rotatably disposed. A U-shaped exciting core on which an excitation winding is wound is disposed on the back surface side of the printed circuit board. The detection windings detect and output, as voltage values, reluctance changes as which excitation magnetic fluxes generated from the excitation winding fluctuate between this excitation winding and the concave/convex portion of the binary cyclic random number sequence code plate. Reduction of precision due to interferences between the excitation magnetic fluxes for detecting an absolute code and other excitation magnetic flux is thereby prevented.

7 Claims, 6 Drawing Sheets

PRIOR ART

Fig. 6

PRIOR ART

Fig. 7
PRIOR ART

ABSOLUTE ENCODER

CROSS-REFERENCE TO RELATED APPLICATION

This application claims priority to Japanese Patent Application No. 2007-073247, filed on Mar. 20, 2007, which is incorporated herein by reference in its entirety.

BACKGROUND OF THE INVENTION

1. Field of the Invention

The present invention relates to an absolute encoder having a scale section in which an absolute code is etched onto the surface of a magnetic material.

2. Description of the Related Art

Figure 7:
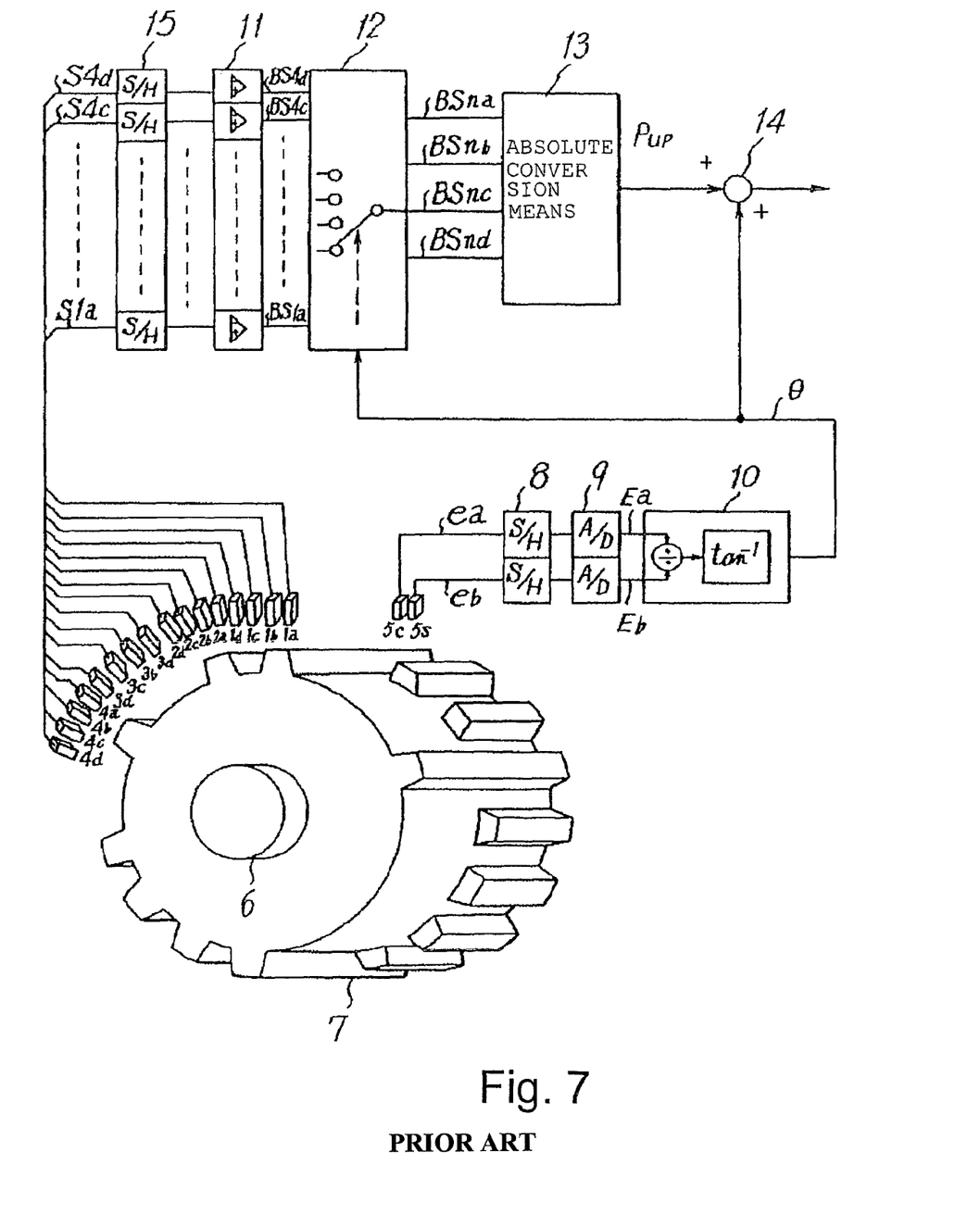
FIG. 7 is a view showing an example of a prior-art absolute encoder.

A prior-art technique will be described with reference to FIG. 7. FIG. 7 shows an absolute encoder described in Patent Document 1 (Japanese Patent Publication JP-A-5-118874). An encoder disc 7 includes an incremental gear shape component for detecting a two-phase sinusoidal signal, and a concave/convex portion conforming to a binary cyclic random number sequence, for detecting an absolute pattern. In addition, magnetic sensors 5s and 5c, which are made of magnetic reluctance elements and which detect the two-phase sinusoidal signal, and magnetic sensors 1a-1d, 2a-2d, 3a-3d and 4a-4d, which detect the absolute pattern, are configured so as to detect the magnetic reluctance change between a permanent magnet not shown and the encoder disc 7. In general, the permanent magnet (not shown) is disposed on the opposite side to the encoder disc 7, that is, on a back side (rear side) as viewed from the magnetic sensors 5s and 5c and those 1a-1d, 2a-2d, 3a-3d and 4a-4d. Here, it is obvious that the concavities and convexities affixed to the outer peripheral part of the encoder disc 7 change depending upon the rotational position of the encoder disc 7. In this regard, at a rotational position at which the number of the convex portions is large, the total quantity of magnetic flux which passes from the permanent magnet to the encoder disc 7 through the magnetic sensors 5s and 5c and those 1a-1d, 2a-2d, 3a-3d and 4a-4d becomes large, whereas at the rotational position at which the number of the concave parts is large, the total quantity of magnetic flux which passes from the permanent magnet to the encoder disc 7 through the magnetic sensors 5s and 5c and those 1a-1d, 2a-2d, 3a-3d and 4a-4d becomes small. Especially, regarding the concave/convex portion of the encoder disc 7 conforming to the binary cyclic random number sequence, the proportion of the concave parts or the convex parts changes extremely, depending upon the rotational position, and, hence, the change of the total magnetic flux quantity from the permanent magnet is also violent. Regarding the concave/convex portion of the encoder disc 7 for detecting the two-phase sinusoidal signal, the change of the total magnetic flux quantity from the permanent magnet is slight owing to the incremental gear shape. However, in a case where the dimension of the permanent magnet in the rotating direction of a gear is not integral times the pitch of the incremental gear shape, the total magnetic flux quantity from the permanent magnet changes depending upon the rotational position within one pitch of the gear shape. Additionally, because the concave/convex portion for the binary cyclic random number sequence excerpts an influence in three dimensions, magnetic flux quantities from the permanent magnet vary as it passes through the magnetic sensors 5s and 5c depending upon the rotational position, due to factors other than the magnetic reluctance change relating to the incremental gear shape.

Next, concerning the change of the total magnetic flux quantity passing through the magnetic sensors 5s and 5c and those 1a-1d, 2a-2d, 3a-3d and 4a-4d from the permanent magnet, basically the magnetic sensors 5s and 5c and those 1a-1d, 2a-2d, 3a-3d and 4a-4d detect the gap quantity changes between them and the concave/convex portion of the encoder disc 7, as magnetic reluctance changes. Therefore, change of the magnetic flux quantity from the permanent magnet ascribable to any other factor becomes a detection error. Especially in the magnetic sensors 5s and 5c for detecting the two-phase sinusoidal signal, deterioration in detection precision has often occurred.

Figure 5:
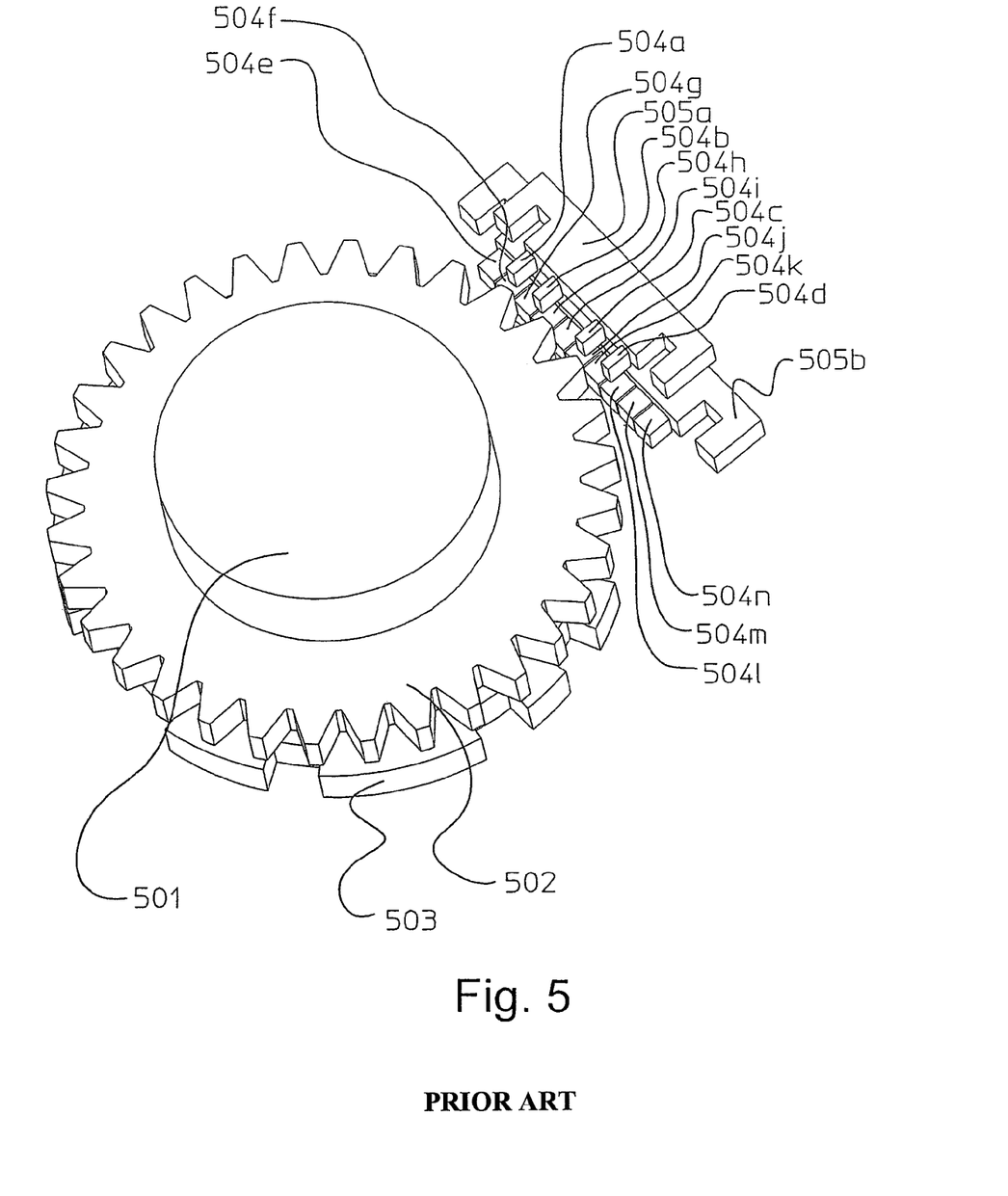
FIG. 5 is a perspective view showing an example of the detection portion of a prior-art absolute encoder.

Next, a prior-art absolute encoder different from that of Patent Document 1 (JP-A-5-118874) will be explained. FIG. 5 is a perspective view showing an example of the detection portion of the prior-art absolute encoder. A rotary shaft 501 is supported in a plurality of bearings (not shown), so as to be rotatable. A gear 502 for detecting a two-phase sinusoidal signal and a binary cyclic random number sequence code plate 503 are fixed to the rotary shaft 501. Magnetic sensors 504a-504d for detecting the two-phase sinusoidal signal, which are made of magnetic reluctance elements, are disposed so as to oppose to the outer peripheral surface of the gear 502 for detecting the two-phase sinusoidal signal and to be spaced therefrom by predetermined gaps. Magnetic sensors 504e-504n for detecting a binary cyclic random number sequence, which are made of magnetic reluctance elements, are also disposed so as to oppose to the outer peripheral surface of the binary cyclic random number sequence code plate 503, and to be spaced therefrom by predetermined gaps. A core 505a for exciting the two-phase sinusoidal signal, which is made of a magnetic material such as ferrite, is disposed near the back surfaces of the magnetic sensors 504a-504d for detecting the two-phase sinusoidal signal. Similarly, a core 505b for exciting the binary cyclic random number sequence is disposed near the back surfaces of the magnetic sensors 504e-504n for detecting the binary cyclic random number sequence.

Figure 6:
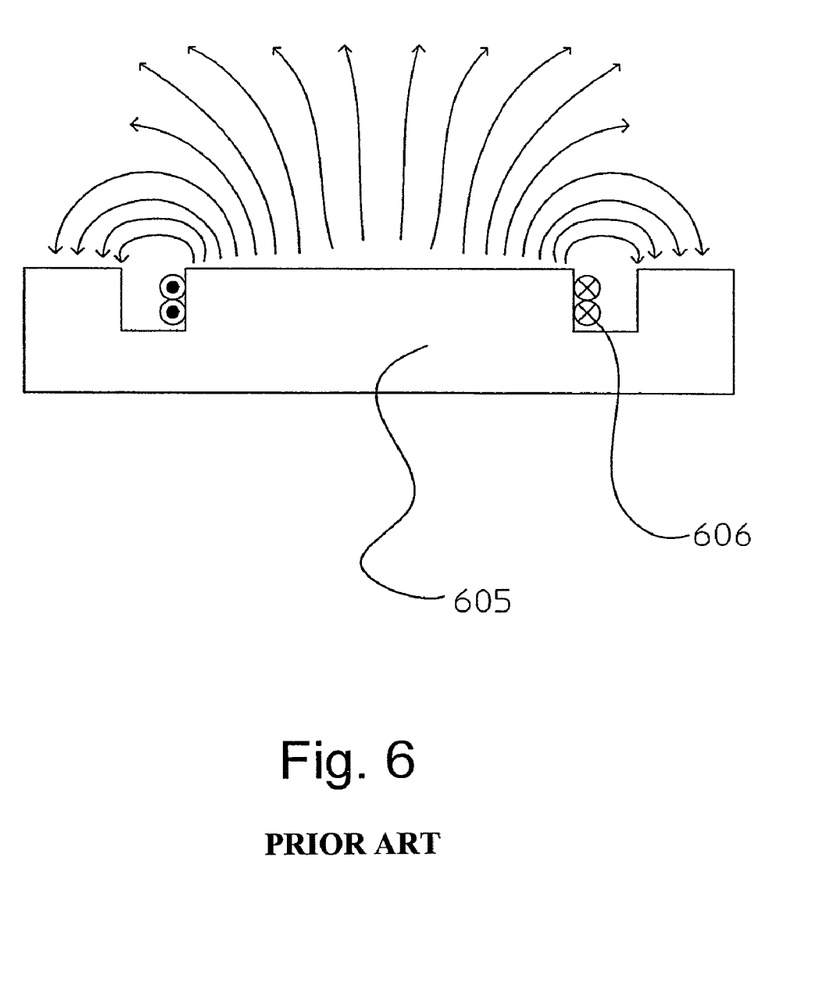
FIG. 6 is a sectional view showing excitation magnetic paths in the case where an excitation winding is wound on an E-shaped exciting core.

An excitation method for the two exciting cores 505a and 505b will be explained with reference to FIG. 6. FIG. 6 is a sectional view showing excitation magnetic paths in an example wherein an excitation winding is wound on an E-shaped exciting core. The winding 606 is wound on the middle convex part of the E-shaped exciting core 605, and the magnetic paths indicated by arrows are formed outward of the E-shaped exciting core 605. The E-shaped exciting cores 505a and 505b are separated for the two-phase sinusoidal signal and for the binary cyclic random number sequence, whereby the signal and the sequence are endowed with respective dedicated excitation magnetic paths. Because when such excitation magnetic paths are formed magnetic flux which forms a loop is generated by the E-shaped exciting core itself, the configuration is advantageous in that the amount of magnetic flux lost is smaller than with excitation magnetic paths based on the shape of a bar magnet.

However, the magnetic paths formed by the E-shaped exciting cores 505a and 505b are subject to three-dimensional interferences. More specifically, there appear loops in which the magnetic flux generated from the middle convex part of the exciting core 505a arrive at the right and left convex parts of the exciting core 505b, and loops in which the magnetic flux generated from the middle convex part of the exciting core 505b arrive at the right and left convex parts of the exciting core 505a. The influence of the interferences of the excitation magnetic flux, and the influence under which the total magnetic flux quantity of the excitation magnetic flux from the exciting core 505b changes depending upon the proportion of the convex parts or concave parts of the concave/convex portion of the binary cyclic random number sequence code plate 503, act together to change the total magnetic flux quantity of the excitation magnetic flux passing through the magnetic sensors 504a-504d for detecting the two-phase sinusoidal signal, and to form the factor for hampering the detection precision. Additionally, the E-shaped exciting cores 505a and 505b become larger than the magnetic sensors 504a-504n which are arranged in the tangential direction of the gear. Especially, among the magnetic sensors 504a-504n, the magnetic sensors 504e-504n for the binary cyclic random number sequence are arranged to be longer in the tangential direction of the gear, so that the E-shaped exciting core 505b has become larger. This has led to the disadvantage that the size of cases for accommodating a sensor section (not shown) had to be increased.

In the absolute encoder stated in Patent Document 1 and illustrated in FIG. 7, the total magnetic flux quantity generated from the permanent magnet changes depending upon the proportion of the convex parts or concave parts of the concave/convex portion of the encoder disc 7, so that a detection error might occur in the detection of the binary cyclic random number sequence by the magnetic sensors 1a-1d, 2a-2d, 3a-3d and 4a-4d. Also in the detection of the two-phase sinusoidal signal by the magnetic sensors 5s and 5c, because the total magnetic flux quantity of excitation magnetic flux varies due to the influence of the proportion of the convex parts or concave parts of the concave/convex portion of the binary cyclic random number sequence, precision has been impaired. Even in the example of FIG. 5, in which the excitation means for detecting the two-phase sinusoidal signal and the excitation means for detecting the binary random number sequence are separated in order to suppress this influence, the excitation magnetic paths generated by the E-shaped exciting cores interfere in three dimensions, so that a precision has been spoilt in the detection of the two-phase sinusoidal signal by the magnetic sensors 504a-504d. Meanwhile, from the viewpoint of size, when the E-shaped exciting cores are adopted, a dimension longer than a dimension in that tangential direction of the gear along which the magnetic sensors 504a-504d and 504e-504n are arranged is required of the exciting cores 505a and 505b, and the size of sensors increased. On the other hand, because the permanent magnet and the winding are used for the excitation means, an excitation magnetic flux quantity is liable to change due to the temperature characteristic of the permanent magnet or the temperature change of a winding resistance. Accordingly, there has been a problem that, when a temperature has changed, the output levels of the magnetic sensors 504e-504n for detecting the binary cyclic random number sequence code has fluctuated, increasing the likelihood of error in detection of the binary cyclic random number sequence code.

SUMMARY OF THE INVENTION

In an absolute encoder according to the present invention, the influence of changes of the total magnetic flux quantity of excitation magnetic flux which depends upon the proportion of the convex parts or concave parts of concave/convex portion of an absolute code on other magnetic sensors is reduced.

In accordance with the absolute encoder of the invention, excitation magnetic flux on the side on which an absolute code is detected is looped by a magnetic formed by a U-shaped exciting core. Therefore, because the interference of an excitation magnetic flux with excitation magnetic flux for detecting a two-phase sinusoidal signal which results when the fluxes are adjacent as in the related art does not occur, an absolute encoder in which a precision of detection of the two-phase sinusoidal signal is not impaired can be realized. Further, because the exciting core on the side for detecting the absolute code is not E-shaped, the scale section of the exciting core in the moving direction thereof need not be made much larger than the magnetic sensors which are disposed in the moving direction of the scale section. Thus, the size of the absolute encoder, including the case of the sensor side, can be reduced.

Further, with a configuration in which windings for detecting the excitation magnetic fluxes are added, the temperature characteristics of the magnetic sensors, etc. can be corrected. Therefore, errors in reading the absolute code resulting from temperature changes can be eliminated, and an absolute encoder capable of operating in a wider range of temperatures can be realized.

DESCRIPTION OF THE PREFERRED EMBODIMENTS

Embodiment 1

Figure 1:
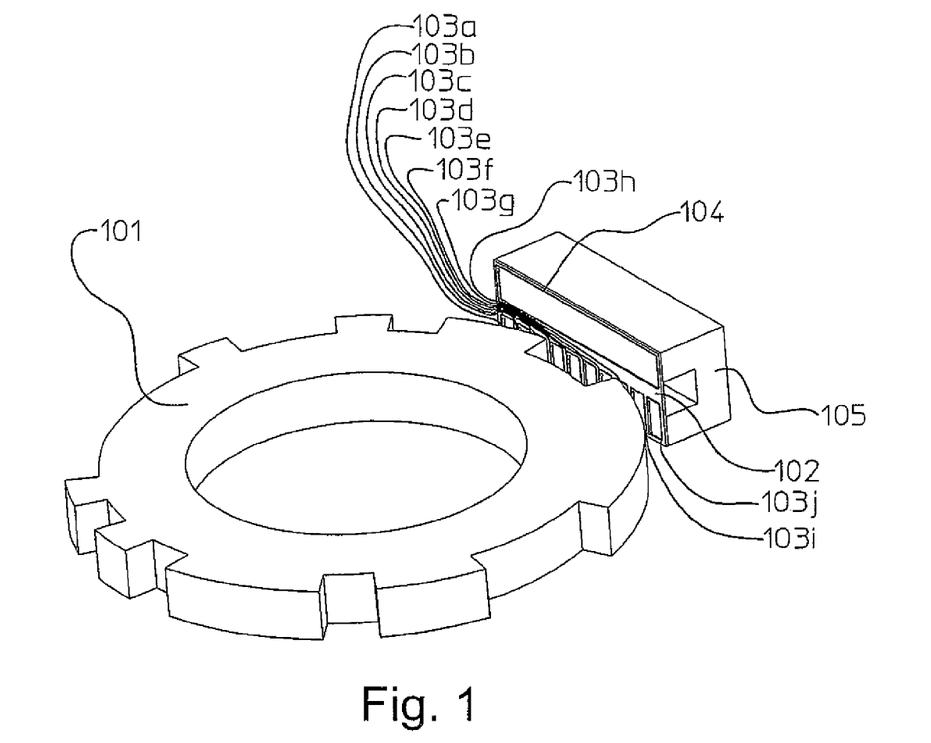
FIG. 1 is a perspective view showing an example of the absolute code detection portion of an absolute encoder according to the present invention.

Next, Embodiment 1 of the present invention will be described in conjunction with the drawings. FIG. 1 is a perspective view showing an example of the absolute code detection portion of an absolute encoder in this embodiment. A binary cyclic random number sequence code plate 101 has a rotary shaft, not shown, fixed thereto, so as to be rotatable. Detection windings 103a-103j, each of which is made of a conductor pattern, and an excitation winding 104, which is made of a conductor pattern, are laid on a printed circuit board 102 which is disposed in opposition to the outer peripheral surface of the binary cyclic random number sequence code plate 101 through a predetermined gap quantity. A U-shaped exciting core 105 which is made of a magnetic member such as ferrite core is disposed on the back surface of the printed circuit board 102. That is, U-shaped cut plain is obtained when the U-shaped exciting core 105 is cut by a plain through a rotary axis of the code plate 101. Excitation magnetic flux following a magnetic path formed by the U-shaped exciting core 105 are generated from the excitation winding 104.

Figure 2:
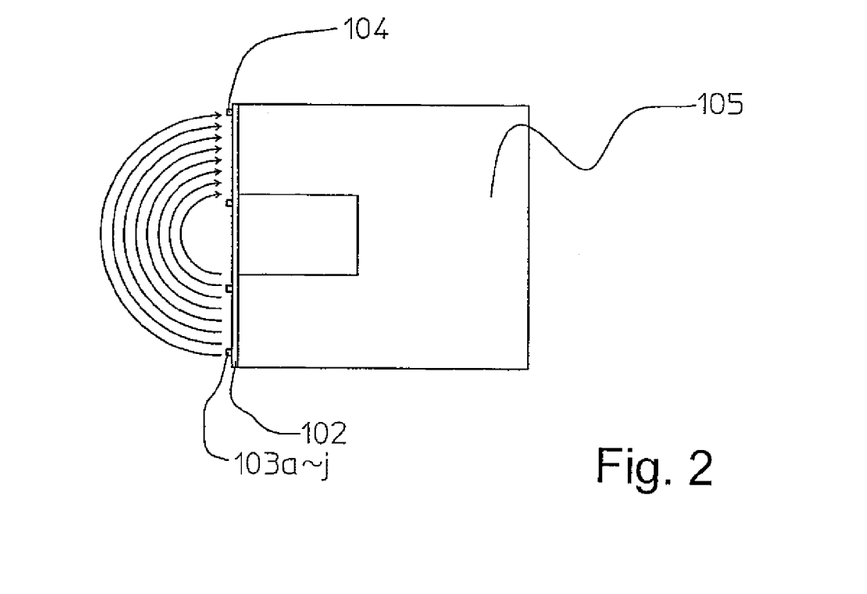
FIG. 2 is a sectional view of a sensor side in FIG. 1, showing magnetic paths of excitation magnetic flux.

FIG. 2 is a sectional view of a sensor side in FIG. 1, in which the same constituents as in FIG. 1 are assigned identical numerals and signs. Magnetic paths as shown in FIG. 2 are formed outside the U-shaped exciting core 105. Here, the detection windings 103a-103j detect reluctance changes generated by the concave/convex portion of the binary cyclic random number sequence code plate 101, in such a way that magnetic flux quantity changes interlinking with these detection windings 103a-103j are converted into induced voltages. Although not shown, a detection portion for detecting a two-phase sinusoidal signal is disposed on the lower side of FIGS. 1 and 2. In this regard, because the exciting magnetic paths are formed as shown in FIG. 2, the interference of the two-phase sinusoidal signal detection portion with the exciting magnetic paths is very little. Additionally, the dimensions of the exciting core 105 in the tangential direction of a gear are substantially equal to the dimensions of the printed circuit board 102 formed with the detection windings 103a-103j. It should be noted that the rotary shaft and the portion for detecting the two-phase sinusoidal signal, which are omitted from illustration in FIG. 1, may be configured as shown in FIG. 5 or FIG. 7.

In this manner, in accordance with the absolute encoder of this embodiment, the excitation magnetic flux on the side for detecting an absolute code is looped by the magnetic path formed by the U-shaped exciting core 105. As such, the excitation magnetic flux the excitation magnetic flux for detecting the two-phase sinusoidal signal, which are normally adjacent, do not interfere with each other, and an absolute encoder in which the precision of detection of the two-phase sinusoidal signal is not impaired can be realized. Additionally, because the exciting core on the side for detecting the absolute code is in the shape of a laterally arranged, the dimension of the exciting core in the tangential direction of the binary cyclic random number sequence ode plate 101 can be made comparatively small. Thus, the overall size of the absolute encoder, including the case of the sensor side, can be reduced.

Embodiment 2

Figure 3:
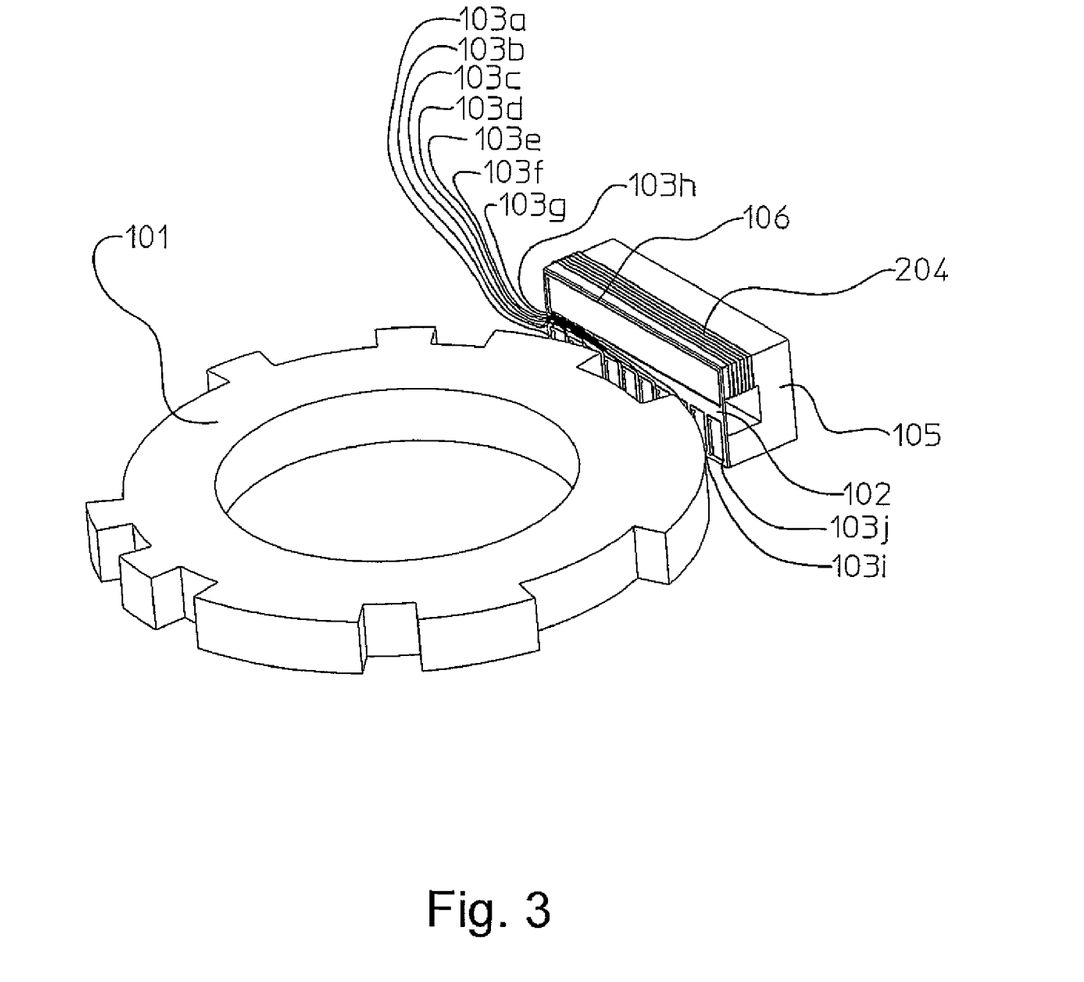
FIG. 3 is a perspective view showing an example of that detection portion of the absolute encoder of the invention which is different from the detection portion in FIG. 1.

FIG. 3 is a perspective view showing an example of the detection portion of an absolute encoder in Embodiment 2 as is different from the absolute encoder in FIG. 1. In FIG. 3, the same constituents as in FIG. 1 are assigned identical numerals and signs. As a point of difference from FIG. 1, however, an excitation winding 204 is directly wound on an exciting core 105, and an upper winding laid on a printed circuit board 102 is an excitation magnetic flux detection winding 106. Accordingly, the same magnetic flux as in FIG. 2 is formed by the excitation winding 204.

In this manner, excitation magnetic paths which are formed are substantially the same as in FIG. 1. Therefore, the role of the excitation magnetic flux detection winding 106 shall be explained here. The excitation winding 204 and the exciting core 105 made of a magnetic material have the characteristics that, when a temperature changes, a winding resistance, a permeability, etc. fluctuate. Accordingly, the excitation magnetic flux which is generated from the excitation winding 204 are not stable. When the excitation magnetic flux increases or decreases due to the temperature change, also the output signal levels of detection windings 103a-103j which detect the reluctance changes between the printed circuit board 102 and the concave/convex portion of a binary cyclic random number sequence code plate 101 become unstable. Additionally, the excitation magnetic flux fluctuates in accordance with the proportion of the convex and concave parts of the concave/convex portion of the binary cyclic random number sequence code plate 101. Therefore, the excitation magnetic flux detection winding 106 causes the detection windings 103a-103j to detect magnetic flux quantities interlinking with a portion enclosed with the excitation magnetic flux detection winding 106, as voltage values.

Figure 4:
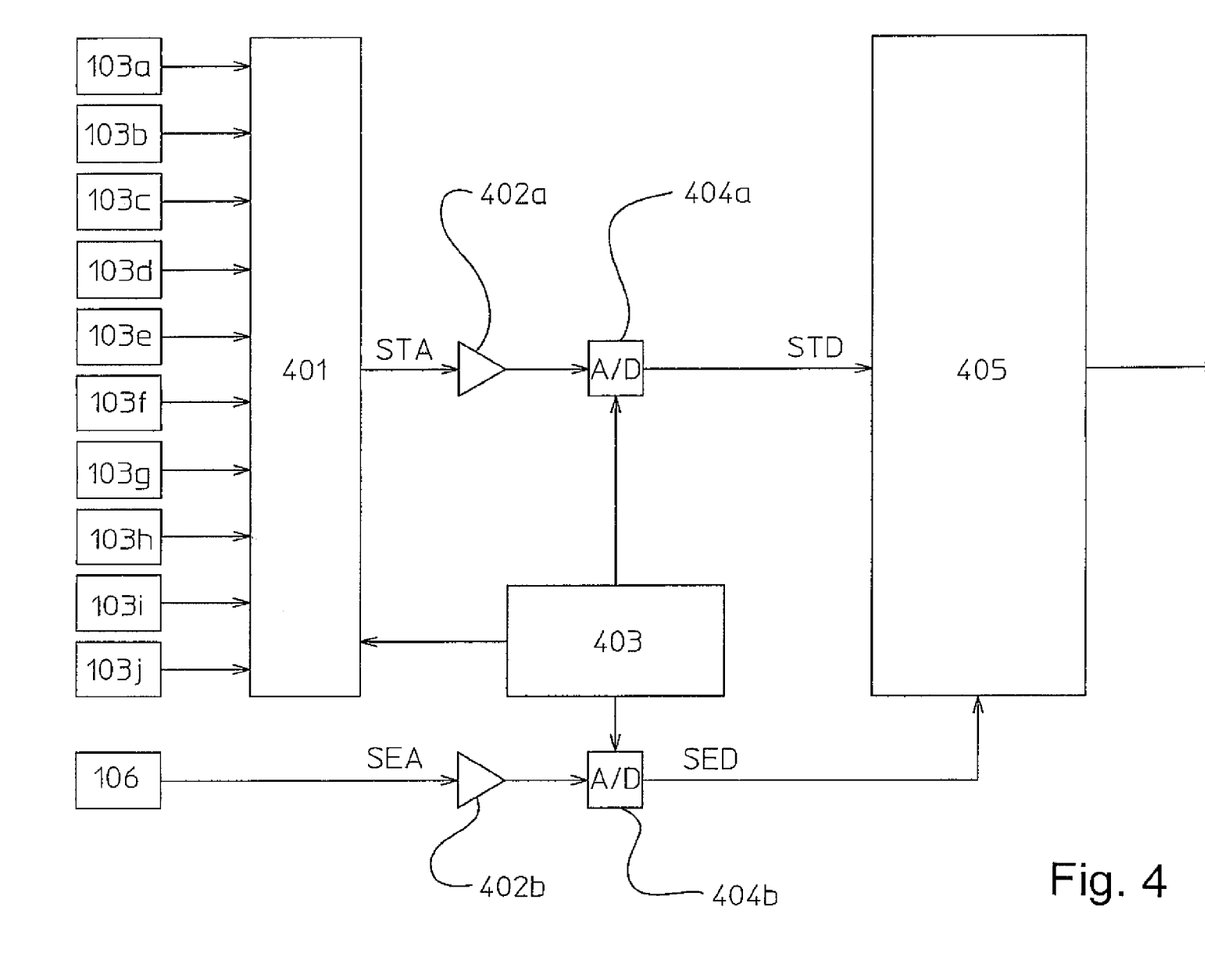
FIG. 4 is a diagram for explaining the processing of output signals from the detection portion of the absolute encoder as shown in FIG. 3.

FIG. 4 is a diagram for explaining the processing of output signals from the detection portion of the absolute encoder in FIG. 3. In FIG. 4, components corresponding to those in FIG. 3 are assigned the same reference numbers. It should be noted that the same configuration as in FIG. 4 applies to output signals from the detection portion of the absolute encoder in FIG. 1, except that in such a configuration the output signal from the excitation magnetic flux detection winding 106 will not be provided.

Signals (concretely, voltage values) output from the detection windings 103a-103j are input to an analog switch 401. The analog switch 401 selects one of the input signals in compliance with a command from a timing generator 403, and outputs the selected signal as a signal STA. The output signal STA is amplified by an amplifier 402a, and the amplified signal is thereafter digitized in an analog/digital converter 404a at a timing commanded by the timing generator 403, and output as a signal STD. The digitized signal STD is subjected to binarization processing and binary cyclic random number sequence processing by a CPU 405 having storage means and arithmetic means, thereby to become absolute position data.

On the other hand, the output signal SEA of the excitation magnetic flux detection winding 106 is amplified by an amplifier 402b. Thereafter, the timing generator 403 outputs to an analog/digital converter 404b a command at the same timing as the timing of the sampling of the analog/digital converter 404a, and the amplified signal SEA is digitized by the analog/digital converter 404b at the given timing, and output as a signal SED. The digitized signal SED of the excitation magnetic flux detection winding 106 is output to the CPU 405. At the CPU 405, the signal STD is corrected in correspondence with the value of the signal SED.

Correction of the signal STD based on the signal SED will next be described. Due to fluctuation of excitation magnetic flux due to a temperature change or the like, the values output by the detection windings 103a-103j do not match the output signal values corresponding to the original binary cyclic random number sequence code. In this embodiment, the current state of the excitation magnetic flux can be known from the output signal from the excitation magnetic flux detection winding 106. Therefore, the correlation between an excitation magnetic flux level detected by the excitation magnetic flux detection winding 106 and the output levels of the detection windings 103a-103j is pre-measured, and corresponding data are stored in the storage means included in the CPU 405. When, for example, the excitation magnetic flux level and the output levels of the detection windings 103a-103j have a substantially proportional relationship, the signal STD may be multiplied by a coefficient conforming to the excitation magnetic flux level, in the CPU 405, followed by the binarization processing and the binary cyclic random number sequence processing. Alternatively, a threshold level in the case of executing the binarization processing may preferably be manipulated in correspondence with the excitation magnetic flux level so as to prevent a detection error from occurring. Additionally, although not illustrated in FIG. 4, a current quantity which is caused to flow through the excitation winding 204 may preferably be changed in such a manner that the excitation magnetic flux level may simply become constant, in correspondence with the output level from the excitation magnetic flux detection winding 106. In such a manner, the change of the excitation magnetic flux can be ascertained from the output signal SED from the excitation magnetic flux detection winding, and any influence of changes in the excitation magnetic flux on the signal STD can be eliminated.

Although Embodiments 1 and 2 have been explained above using illustrative examples, the invention is not restricted to these configurations. For example, although in the example embodiments the magnetic sensors are formed by laying the windings on a printed circuit board, the magnetic sensors can also be configured by employing the magnetic reluctance elements described in Patent Document 1. Also, although in the embodiments a conductor pattern laid on the printed circuit board is used as the excitation magnetic flux detection winding, this excitation magnetic flux detection winding may alternatively be directly wound on the U-shaped exciting core. Alternatively, the excitation winding and the excitation magnetic flux detection winding may well be provided at substantially the same positions on the printed circuit board. Although the described example excitation windings were created by forming the conductor pattern on a printed circuit board or by direct winding on the U-shaped exciting core, it may also be preferable that the U-shaped exciting core itself is a permanent magnet without any winding. Regarding the use of the excitation magnetic flux detection winding and the correction method for the output signal thereof, in addition to the various methods described above, the absolute encoder of the invention can be configured as long as the values of the magnetic sensors are prevented from leading to a detection error, with reference to the output of the excitation magnetic flux detection winding. It should also be noted that although the embodiments of the invention were described using examples of rotary type absolute encoders, the invention is also applicable to a rectilinear type encoder.

What is claimed is:

1. An absolute encoder comprising:
   a scale section in which an absolute code indicating absolute positions is recorded by concaves; and
   a sensor section which is spaced a predetermined gap quantity from said scale section and is disposed so as to be relatively movable, and which detects the absolute code;
   said sensor section including:
   a plurality of magnetic sensors; and
   a magnetic core which excites said plurality of magnetic sensors;
   wherein said magnetic core has a U-shaped cut obtained from cutting the magnetic core by a plane through an rotation axis of said scale section.

2. An absolute encoder as defined in claim 1, wherein said scale section is in the form of a disc, and the absolute code is recorded by cutting off an outer peripheral part of the disc.

3. An absolute encoder as defined in claim 1, wherein the excitation means includes an excitation winding, and said plurality of magnetic sensors are made of windings for detecting the absolute code.

4. An absolute encoder as defined in claim 3, wherein:
   said excitation winding and said windings for detecting the absolute code are formed by conductor patterns on an identical printed circuit board; and
   two bifurcated distal end parts of the U-shaped magnetic core are proximate to said printed circuit board, and said excitation winding is arranged in one of those two regions on said printed circuit board to which the two bifurcated distal end parts oppose, while said windings for detecting a plurality of positions of the absolute code are arranged in the other region.

5. An absolute encoder as defined in claim 4, further comprising an excitation magnetic flux detection winding which detects a magnitude of an excitation magnetic flux passing through the U-shaped magnetic core.

6. An absolute encoder as defined in claim 5, wherein said excitation magnetic flux detection winding is arranged at substantially the same position as that of said excitation winding on said printed circuit board, by using a conductor pattern.

7. An absolute encoder as defined in claim 5, wherein output signals of said plurality of magnetic sensors are corrected on the basis of a magnitude of an output signal of said excitation magnetic flux detection winding.

* * * * *